United States Patent
Kawashima et al.

(10) Patent No.: US 6,755,476 B2
(45) Date of Patent: Jun. 29, 2004

(54) TENSION STRUCTURE OF SEAT BACK

(75) Inventors: Isao Kawashima, Tochigi-ken (JP); Takashi Yamaguchi, Saitama (JP)

(73) Assignees: TS Tech Co., Ltd. (JP); Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 10/302,147

(22) Filed: Nov. 22, 2002

(65) Prior Publication Data

US 2003/0098602 A1 May 29, 2003

(30) Foreign Application Priority Data

Nov. 29, 2001 (JP) ........................................ 2001-364514

(51) Int. Cl.⁷ ................................................. A47C 7/02
(52) U.S. Cl. ................................ 297/452.52; 297/284.4
(58) Field of Search .......................... 297/284.2, 284.4, 297/452.52

(56) References Cited

U.S. PATENT DOCUMENTS

| | | | | |
|---|---|---|---|---|
| 3,797,886 A | * | 3/1974 | Griffiths ................. | 297/452.23 |
| 3,994,482 A | * | 11/1976 | Platt et al. ................... | 267/102 |
| 4,407,492 A | * | 10/1983 | Muzzell ....................... | 267/103 |
| 4,627,661 A | * | 12/1986 | Ronnhult et al. ......... | 297/284.4 |
| 5,697,672 A | * | 12/1997 | Mitchell ................... | 297/284.4 |
| 6,068,336 A | * | 5/2000 | Schonauer ................ | 297/284.9 |
| 6,152,531 A | * | 11/2000 | Deceuninck .............. | 297/284.4 |
| 6,375,262 B1 | * | 4/2002 | Watanabe ................. | 297/284.4 |
| 6,402,246 B1 | * | 6/2002 | Mundell .................... | 297/284.4 |
| 6,499,803 B2 | * | 12/2002 | Nakane et al. ........... | 297/284.4 |
| 6,557,938 B1 | * | 5/2003 | Long ......................... | 297/284.4 |
| 2003/0062758 A1 | * | 4/2003 | Fernandes de Pinho et al. . | 297/452.52 |

FOREIGN PATENT DOCUMENTS

| | | | | |
|---|---|---|---|---|
| GB | 2035792 A | * | 6/1980 | ............ A47C/7/22 |
| JP | 475882 | | 2/1972 | |
| JP | 06165718 A | * | 6/1994 | ............ A47C/7/46 |

\* cited by examiner

*Primary Examiner*—Peter M. Cuomo
*Assistant Examiner*—Stephanie Harris
(74) *Attorney, Agent, or Firm*—Dann, Dorfman, Herrell and Skillman, P.C.

(57) ABSTRACT

The invention provides a tension structure for constructing a seat back of a seat for an automotive vehicle. Coil springs 3a, 3b, 4a, 4b are provided as tension members which are bridged between respective side portions 11, 12 of a seat back frame 1 and respective vertical bars 20, 21 of a tension assembly 2 in an upper portion and a middle portion. On the contrary, linear wires 5a, 5b in which one wire end is entwined and fastened to axes of the vertical bars 20, 21 and another wire end is inserted and fastened to stop rings 14, 15 of the side frame portions 11, 12 are provided in a lower portion. Accordingly, a sitting attitude is intended to be stabilized by increasing a supporting pressure of a lumbar part applied by the tension assembly 2 by means of the linear wires 5a, 5b.

3 Claims, 4 Drawing Sheets

TENSION STRUCTURE OF SEAT BACK

TECHNICAL FIELD

The present invention mainly relates to a tension structure of a seat back which increases a supporting pressure of a lumbar part more than a supporting pressure between a waist part and a shoulder part of a sitter, in order to construct a seat back of a seat for an automotive vehicle having an improved sitting characteristic by intending to stabilize a sitting attitude.

BACKGROUND ART

In general, in the seat back of the seat for the automotive vehicle, a tension structure which supports between a the lumbar part and a back part of the sitter is constructed by providing with a seat back frame having a substantially quadrilateral frame shape, and assembling a tension assembly constituted by a cushion spring or a lumbar support within the seat back frame.

Among the cushion spring and the lumbar support, the cushion spring is exemplified. The cushion spring is constructed as the tension assembly by bridging a plurality of narrow wires or zigzag springs between right and left vertical bars in a parallel manner. The cushion spring is assembled within the seat back frame by being tensioned and held by tension members which are bridged over an upper portion, a lower portion and a middle portion between each of side frame portions of the seat back frame and each of axes of the vertical bars.

Conventionally, the tension members are assembled in all of the upper portion, the lower portion and the middle portion in such a manner as to be provided with coil springs having the same spring rate and tension and hold the cushion spring with respect to each of the side frame portions in the seat back frame.

In accordance with the coil spring, since the cushion spring is largely elastically displaced due to a load of the sitter, a great displacement stroke can be obtained by the cushion spring.

In this case, in the seat back of the seat for the automotive vehicle, since the lumbar part holding characteristic can be applied by making the supporting pressure of the portion corresponding to the lumbar part higher than the supporting pressure of the portion corresponding to a portion between the waist part and the shoulder part of the sitter, even when the portion between the waist part and the shoulder part of the sitter is largely elastically displaced, it is possible to intend to stabilize a sitting attitude and it is possible to construct a structure having an improved sitting characteristic.

However, in the tension structure by the coil springs having the same spring rate as mentioned above, the supporting pressure of the portion corresponding to the lumbar part can not be made higher than the portion between the waist part and the shoulder part of the sitter.

In this case, in order to increase the supporting pressure of the portion corresponding to the lumbar part, there can be considered a structure of tensioning and holding the portion corresponding to the lumbar part by a coil spring having a higher spring rate than that of the coil spring which tensions and holds the portion between the waist part and the shoulder part of the sitter.

In this case, since it is necessary to prepare the other coil spring having the different spring rate by using the coil spring in accordance with the same aspect, a cost increased is caused. In addition, since it is necessary to perform an assembling operation while differentiating the coil springs on the basis of the difference of the spring rate, an operation becomes complex.

An object of the present invention is to provide a tension structure of a seat back which can keep an improved cushion characteristic and can be assembled so as to increase a supporting pressure of a lumbar part without causing a cost increase and a complex operation by paying attention to a tension member of a tension assembly.

Further, another object of the present invention is to provide a tension structure of a seat back which can be securely assembled in accordance with a simple operation so as to increase a supporting pressure of a lumbar part.

DISCLOSURE OF THE INVENTION

The present invention is provided with coil springs having the same spring rate, as tension members between side frame portions of a seat back frame and vertical bars of a tension assembly in upper portions and middle portions in the respective side frame portions and the respective vertical bars. On the contrary, a tension structure of a seat back is constructed by providing a linear wire which is obtained by entwining and fastening one wire end which is bent in a predetermined axial shape to an axis of the vertical bar and inserting and fastening another wire end which is bent in a predetermined axial shape to a stop ring in the side frame portion, in a lower portion, and tensioning and holding the tension assembly within the seat back frame by the coil springs in the upper portion and the middle portion and the linear wire in the lower portion.

Accordingly, with respect to the portion corresponding to the region between the waist part and the shoulder part of the sitter, an improved cushion characteristic can be kept by the coil spring which is elastically compressed and expanded, and with respect to the portion corresponding to the lumbar part, a degree of elastic displacement is restricted by the linear wire which is not expanded. Accordingly, since it is possible to increase the supporting pressure of the lumbar part and it is possible to achieve a stability of the sitting attitude, it is possible to construct the tension structure of the seat back having an improved sitting characteristic.

In addition, since the linear wire is inexpensive, causes no cost increase, and is different in aspect from the coil spring, it is easy to distinguish both of the elements. Accordingly, it is possible to perform an assembling operation with accompanying no troublesome of the operation.

Further, the present invention is provided with a linear wire constituted by a linear wire main axis which extends from the side frame portion of the seat back frame toward an oblique lower side with an acute angle to an axis of the vertical bar, a wire end which is bent at an acute angle from the wire main axis and is inserted to the stop ring of the side frame portion so as to be stopped, a substantially semicircular winding axis which is retained to the axis of the vertical bar, and a wire end which extends from the winding axis and intersects on the axis of the wire main axis.

The linear wire can be bridged between each of the side frame portions of the seat back frame and each of the vertical bars of the tension assembly in accordance with a simple operation of inserting one wire end to the stop ring of the side frame portion, deforming the wire end which intersects on the axis of the wire main axis wider than the wire main axis so as to retain the substantially semicircular winding axis to the axis of the vertical bar, and elastically returning back the wire end which intersects on the axis of the wire main axis. In the retaining state, since the winding axis of the linear wire is brought into contact with the axis of the vertical bar at two contact points which are obliquely apart from each other via the axis of the vertical bar, the linear wire can be securely retained to the axis of the vertical bar so that the winding axis does not deflected and moved vertically in the axial direction of the vertical bar, and can stably tension and hold the lower portion of the tension assembly.

The other features than the features mentioned above will be apparent from an embodiment for carrying out the invention which will be described later.

MODE FOR CARRYING OUT THE INVENTION

Figure 1:
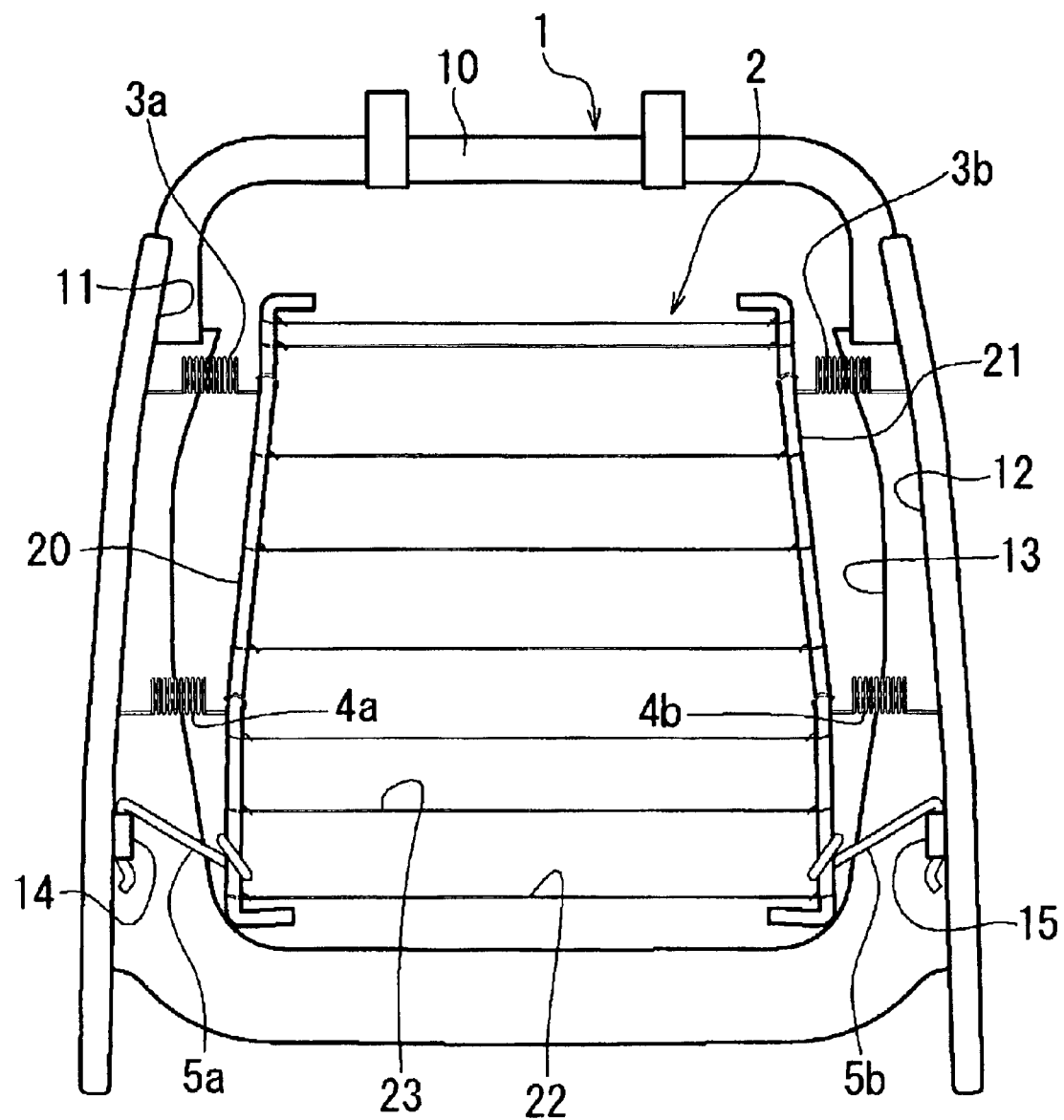
FIG. 1 is a schematic view which shows a tension structure of a seat back which is provided with a cushion spring in accordance with one embodiment of the present invention as a tension assembly, from a front face.

A description will be given below of an embodiment with reference to the accompanying drawings. A basic aspect of a tension structure in accordance with an illustrated embodiment will be described with respect to a structure provided with a cushion spring shown in FIG. 1. The tension structure is provided with a seat back frame 1, a cushion spring 2, and tension members 3a, 3b, 4a, 4b, 5a and 5b of the cushion spring 2. The cushion spring 2 is tensioned and held within the seat back frame 1 by the tension members 3a, 3b, 4a, 4b, 5a and 5b.

The seat back frame 1 is formed by an upper frame portion 10 which is formed in a substantially bottom chord curved shape from a pipe member, left and right side frame portions 11 and 12 constituted by a pipe member having a predetermined length, and a back frame portion 13 constituted by a substantially C-shaped formed frame. Among them, the upper frame portion 10 is bridged and welded between upper portions of the side frames 11 and 12, and the side frame portions 11 and 12 are welded and fixed to left and right portions of the back frame portion 13, whereby a substantially quadrilateral frame-shaped seat back frame 1 is constructed.

The cushion spring 2 is provided with left and right vertical bars 20 and 21, and narrow wires 22 and 23 like piano wires are entwined and stopped to axes of the vertical bars 20 and 21 at respective wire ends so as to form the tension members, thereby being assembled as a structure for receiving and supporting a back pad (not shown) from a back side by bridging a plurality of narrow wires 22 and 23 between the vertical bars 20 and 21 in parallel to each other. In this structure, the vertical bars 20 and 21 are provided in such a manner as to be coated with a resin tube for preventing friction sound.

Among the tension members 3a, 3b, 4a, 4b, 5a and 5b, the coil springs 3a, 3b, 4a and 4b having the same spring rate are provided so as to be positioned on one line in left and right sides, for constructing structures which are bridged in an upper side and a middle side of the cushion spring 2. The coil springs 3a, 3b, 4a and 4b are bridged and provided in the upper portion and the middle portion between the vertical bars 20 and 21 and the side frame portions 11 and 12 by retaining respective hook-shaped spring ends to axes of the vertical bars 20 and 21 and stop holes (not shown) of the side frame portions 11 and 12.

On the contrary, linear wires 5a and 5b which are bent in a predetermined shape at both ends from a solid thick metal wire are provided as structures which are bridged in a lower portion of the cushion spring 2. The linear wires 5a and 5b are bridged and provided in the lower portion between the vertical bars 20 and 21 and the side frame portions 11 and 12 by entwining one wire end to the axes of the vertical bars 20 and 21, and inserting and fastening another wire end to stop rings 14 and 15 which are provided in the side frame portions 11 and 12.

Figure 2:
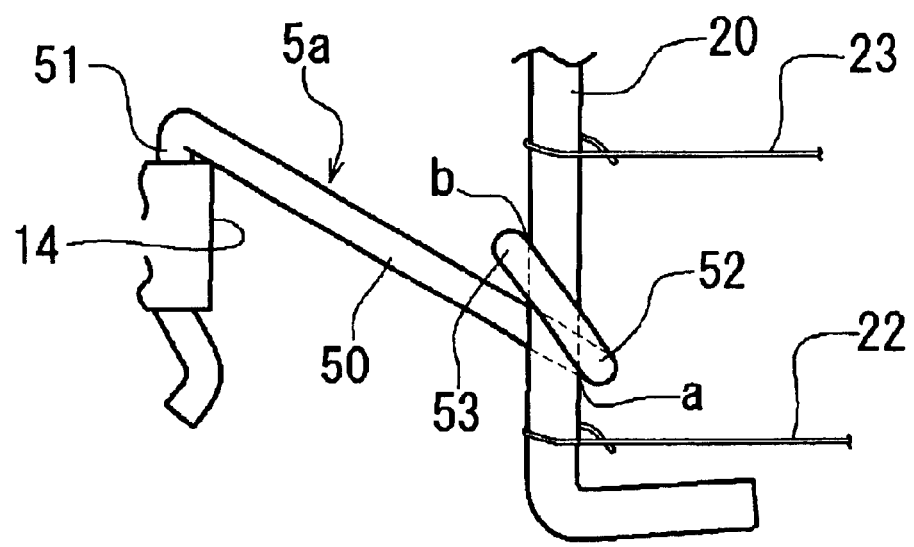
FIG. 2 is a schematic view which shows a retaining structure for a linear wire constituting the tension structure in FIG. 1, from a front face.
Figure 3:
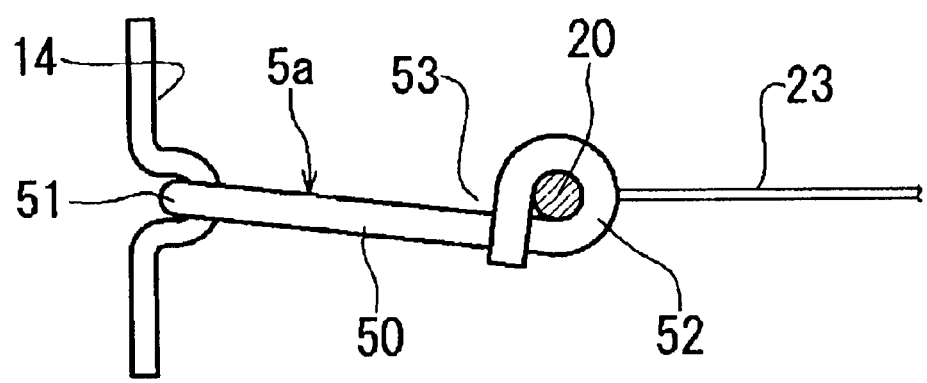
FIG. 3 is a schematic view which shows the retaining structure for the linear wire in FIG. 2, in a plan view.

The linear wires 5a and 5b are previously bent axially as one fastening device. The linear wire 5a is formed, as shown in FIGS. 2 and 3 (only one side is illustrated), by a linear wire main axis 50 which extends from the side frame portions 11 and 12 (refer to FIG. 1) of the seat back frame 1 toward an acute oblique lower side to an axis of the vertical bar 20, a wire end 51 which is bent at an acute angle from the wire main axis 50 and is inserted and fastened to the stop ring 14 of the side frame portion 11, a substantially semicircular winding axis 52 which is retained to the axis of the vertical bar 20, and a wire end 53 which extends from the winding axis 52 and intersects on an axis of the wire main axis 50.

The linear wire 5a can be previously provided on the axis of the vertical bar 20 by retaining the substantially semicircular winding axis to the axis of the vertical bar in accordance with an elastic deformation of the wire end 53 intersecting on the axis of the wire main axis 50 in a direction of making the wire end 53 wider than the wire main axis 50, and elastically returning the wire end intersecting on the axis of the wire main axis. Further, at a time of retaining the linear wire 5a from the vertical bar 20 to the side frame portion 11, the wire end 51 may be inserted and fastened to the stop ring 41 of the side frame portion 11. Accordingly, the linear wire 5a can be bridged between each of the side frames 11 of the seat back frame 1 and each of the vertical bars 20 in accordance with a simple operation.

In the retaining state of the linear wire 5a, in view of the side of the axis of the vertical bar 20, since the wire main axis 50 moves to the obliquely upper side, the winding axis 52 is brought into contact with the axis of the vertical bar 20 at two contact points a and b (refer to FIG. 3) which are obliquely apart from each other via the axis of the vertical bar 20. Accordingly, the winding axis 52 can be securely retained so as not to be vertically shifted and moved in the axial direction of the vertical bar 20.

Figure 4:
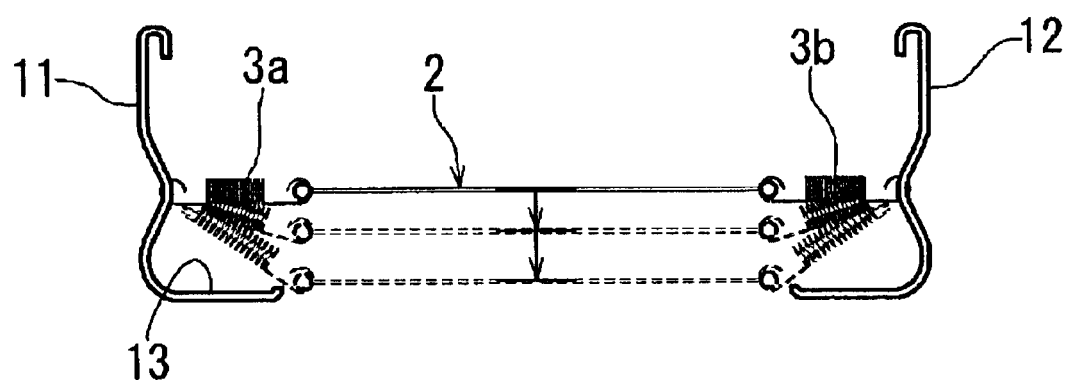
FIG. 4 is a schematic view which shows a displacement state of the seat back applied by a coil spring in FIG. 1.
Figure 5:
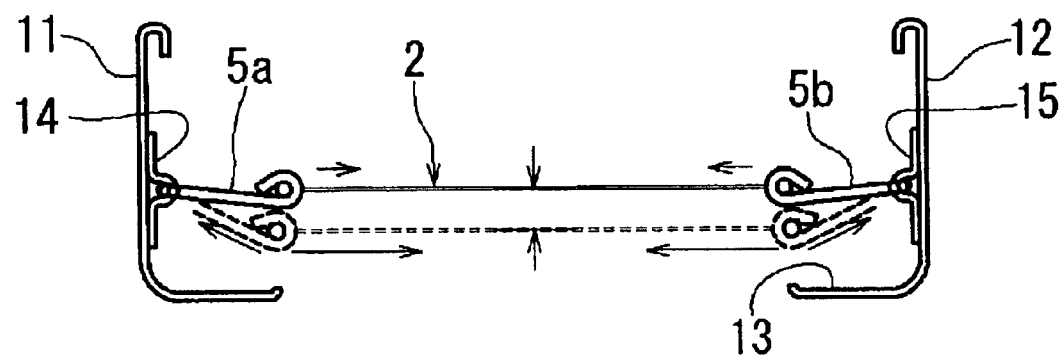
FIG. 5 is a schematic view which shows a displacement state of the seat back applied by the linear wire in FIG. 1.

In the cushion structure of the seat back structured in the manner mentioned above, the portion corresponding to a part between the waist part and the shoulder part of the sitter is largely elastically displaced by the coil springs 3a, 3b, 4a and 4b which tension and hold the cushion spring 2, as shown in FIG. 4, due to a load of the sitter. On the contrary, with respect to the portion corresponding to the lumbar part, even when the axes of the linear wires 5a and 5b swing around the stop ring 14 of the side frame portion 11 corresponding to the supporting point as shown in FIG. 5, the axis does not extend. Accordingly, a degree of the elastic displacement can be restricted.

Accordingly, with respect to the portion corresponding to the part between the waist part and the shoulder part of the sitter, the improved cushion characteristic can be kept, and with respect to the portion corresponding to the lumbar part, the degree of the elastic displacement can be restricted and the supporting pressure of the lumbar part can be increased. Therefore, it is possible to intend to stabilize the sitting attitude by applying a holding characteristic of the lumbar part.

Figure 6:
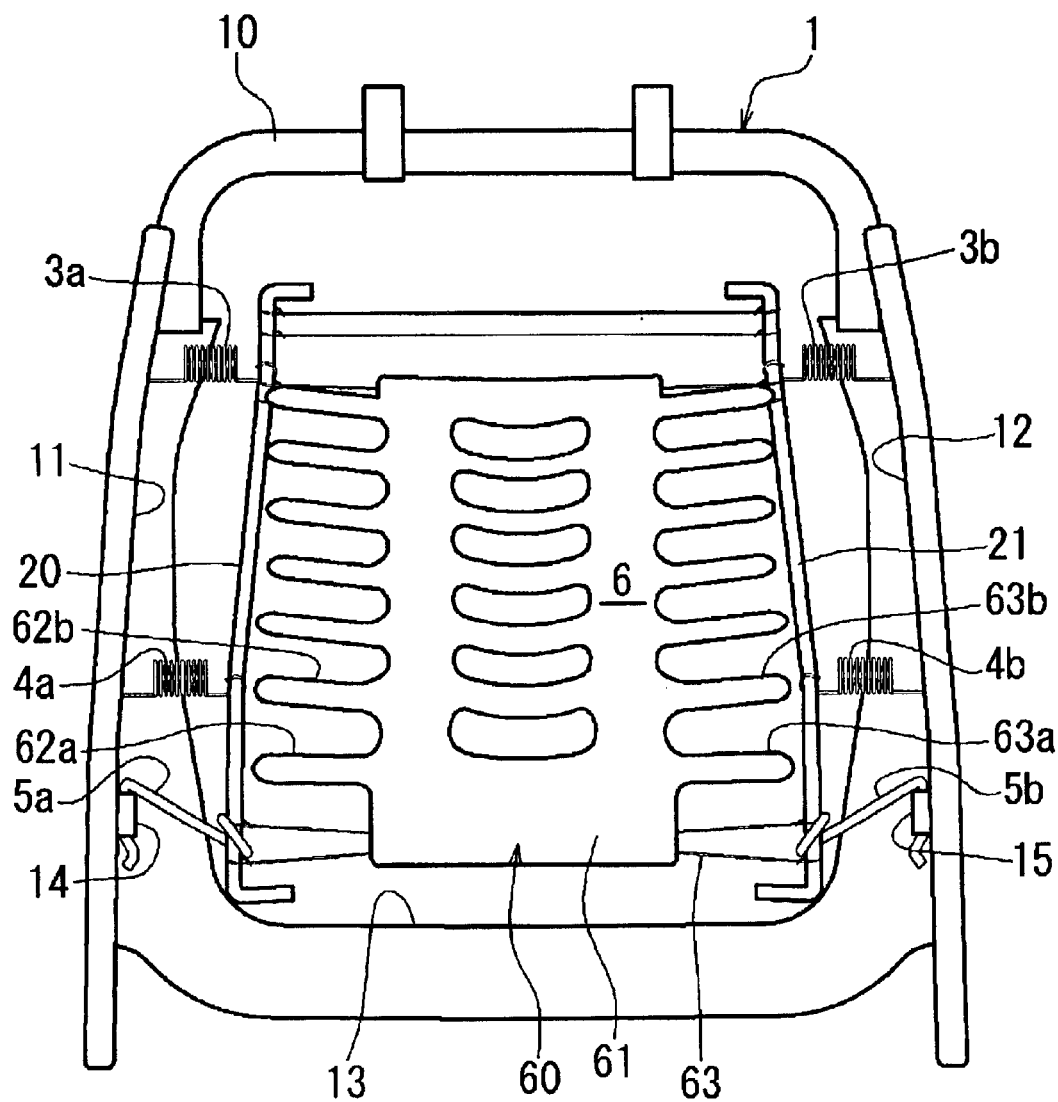
FIG. 6 is a schematic view which shows the tension structure of the seat back provided with a lumbar support in accordance with another embodiment of the present invention as the tension assembly.

Next, a description will be given of a case in which a lumbar support 6 is provided as a cushion assembly as shown in FIG. 6. The lumbar support 6 is assembled so as to have a main surface portion 61 which can displace a center portion forward in a swelling manner, and a flexible plate 60 which is formed by protruding a plurality of fin portions 62a, 62b, 63a and 63b from the main surface portion 61 leftward and rightward so as to form a tension member. The flexible plate 60 is provided between the vertical bars 20 and 21 by tensioning and connecting the center main surface portion 61 to the axes of the vertical bars 20 and 21 by a plurality of narrow wires 63 and 64.

The lumbar support 6 is also provided with the coil springs 3a, 3b, 4a and 4b as the tension members in the upper portion and the middle portion, in the same manner as that of the cushion spring 2 mentioned above, and is provided with the linear wires 5a, 5b, 4a and 4b as the tension member in the lower portion, thereby bridged and provided between the axes of the vertical bars 20 and 21 and the side frame portions 11 and 12 of the seat back frame 1.

In the lumbar support, it is possible to intend to stabilize the sitting attitude on the basis of the supporting pressure for the back due to the center swelling of the main surface portion 61, and the supporting pressure of the lumbar part due to the flexible plate 60 disposed close to the lower portion, and it is possible to intend to improve a cushion performance.

As mentioned above, in accordance with the tension structure of the seat back of the present invention, with respect to the portion corresponding to the part between the waist part and the shoulder part of the sitter, the improved cushion characteristic is kept, and with respect to the portion corresponding to the lumbar part, the degree of the elastic displacement can be restricted and the supporting pressure of the lumbar part is increased. Accordingly, it is possible to intend to stabilize the sitting attitude, and it is possible to structure the seat back of the seat for the automotive vehicle which has an improved sitting characteristic as a whole.

As mentioned above, the terms and expressions in the present specification are only used for description, and does not limit the contents of the present invention. If the restrictive terms or expressions are employed, there is no intention that the equivalent to the aspect of the present invention mentioned above and a part of the present invention should be excluded. Accordingly, various modifications can be employed within the scope of the present invention to which the patent right is required.

What is claimed is:

1. A tension structure for the seat back of a seat comprising:
    a substantially quadrilateral-shaped seat back frame, said seat back frame including a pair of spaced apart side sections, said side sections having first upper, middle, and lower regions;
    a pair of stop rings each mounted to the first lower region of each of said side sections;
    a tension assembly arranged within said seat back frame, said tension assembly comprising:
        right and left vertical bars having second upper, middle, and lower regions; and
        support means bridged between said right and left vertical bars;
    a pair of coil springs each connected between one of the side sections and one of the vertical bars at the upper regions thereof,
    a second pair of coil springs each connected between one of the side sections and one of the vertical bars at the middle regions thereof; and
    linear wire means connected between each of said stop rings and the vertical bars at the lower regions thereof to restrict movement of a lower area of said tension assembly;
    whereby when a person sits on said seat, displacement of the lower area of said tension assembly corresponding to a lumbar region of the person's back is more restricted than displacement of middle and upper areas of said tension assembly which correspond to the waist and shoulder regions respectively of the person's back.

2. A tension structure according to claim 1 wherein said linear wire means comprises a pair of solid metal wires each having first and second end portions, each of said first end portions having a shape adapted for retaining the solid metal wire on its respective vertical bar and each of said second end portions having a shape adapted for inserting and retaining said solid metal wire in its respective stop ring.

3. A tension structure according to claim 2 wherein said solid metal wires each comprise a linear wire main axis extending between the first and second end portions, the shape of each of said first end portions comprises a substantially semicircular winding axis and a wire end that extends from the winding axis so as to intersect with the linear wire main axis, and the shape of each of said second end portions comprises a wire end that extends at an acute angle relative to said wire main axis.

* * * * *